(12) United States Patent
Tsui et al.

(10) Patent No.: US 7,702,049 B2
(45) Date of Patent: Apr. 20, 2010

(54) SIGNAL CONVERSION APPARATUS, SYSTEMS, AND METHODS

(75) Inventors: Ernest Tsui, Cupertino, CA (US); Qinghua Li, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 1916 days.

(21) Appl. No.: 10/677,058

(22) Filed: Sep. 30, 2003

(65) Prior Publication Data

US 2005/0069046 A1 Mar. 31, 2005

(51) Int. Cl.
*H04L 1/02* (2006.01)
*H04B 7/10* (2006.01)

(52) U.S. Cl. .................. 375/347; 375/316; 375/340; 375/346

(58) Field of Classification Search ................ 375/347, 375/316, 340, 346
See application file for complete search history.

(56) References Cited

U.S. PATENT DOCUMENTS

| 5,574,450 | A | * | 11/1996 | Hiramatsu et al. | ........... 341/112 |
| 5,872,540 | A | * | 2/1999 | Casabona et al. | ........... 342/362 |
| 6,175,327 | B1 | * | 1/2001 | Lin et al. | ............... 342/357.06 |
| 6,266,014 | B1 | * | 7/2001 | Fattouche et al. | ........... 342/450 |
| 6,373,909 | B2 | * | 4/2002 | Lindquist et al. | ............ 375/346 |
| 6,506,160 | B1 | * | 1/2003 | Van Stralen et al. | ......... 600/459 |
| 6,639,551 | B2 | * | 10/2003 | Li et al. | ..................... 342/381 |
| 6,725,025 | B1 | * | 4/2004 | Schmidl et al. | .......... 455/278.1 |
| 6,819,706 | B1 | * | 11/2004 | Lim | ........................... 375/130 |
| 7,054,397 | B1 | * | 5/2006 | Kawanabe | .................. 375/347 |
| 7,181,175 | B2 | * | 2/2007 | Nimmo-Smith et al. | ..... 455/101 |
| 2002/0168035 | A1 | * | 11/2002 | Carlson et al. | .............. 375/343 |

* cited by examiner

*Primary Examiner*—Ted M Wang
(74) *Attorney, Agent, or Firm*—Schwegman, Lundberg & Woessner, P.A.

(57) ABSTRACT

An apparatus and a system, as well as a method and article, may operate to shift a center frequency of selected ones of a plurality of received signals by selected amounts to provide a plurality of shifted signals located in a frequency domain, which may then be combined into a composite signal centered at a selected frequency.

19 Claims, 4 Drawing Sheets

SIGNAL CONVERSION APPARATUS, SYSTEMS, AND METHODS

TECHNICAL FIELD

Various embodiments described herein relate to communications generally, including apparatus, systems, and methods used to receive and process signals, such as multiplexers and analog-to-digital converters (ADCs).

BACKGROUND INFORMATION

As the average size of semiconductor features continues to decrease, the area and cost associated with analog circuitry represents a growing percentage of many circuits, especially those used in the processing or conversion of signals. This phenomenon becomes even more apparent when certain analog circuitry elements are duplicated within a single device.

DETAILED DESCRIPTION

Figure 1:
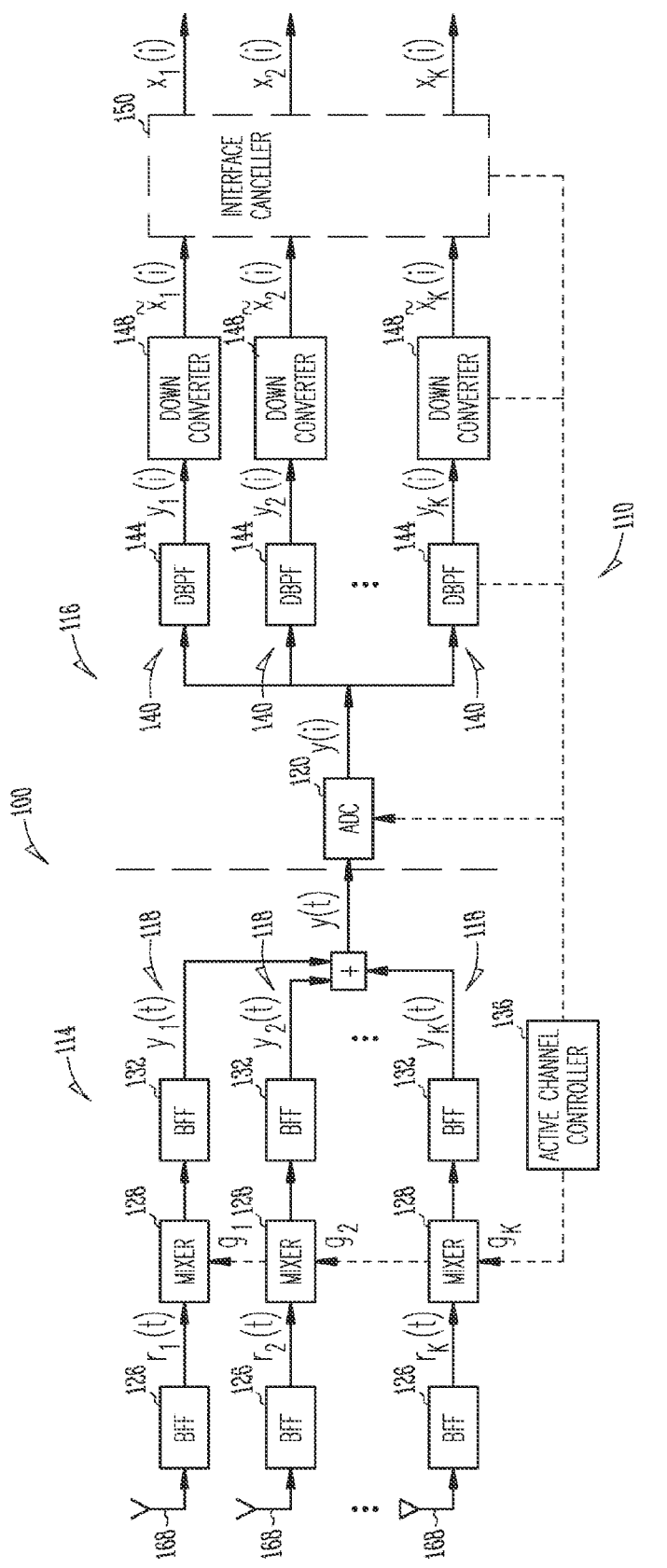
FIG. 1 is a block diagram of apparatus and systems according to various embodiments.

Many occasions arise where multiple signals may be received. In such cases, multiple parallel RF receiver chains may be used to process signals from the same frequency band (e.g., a smart antenna system employing multiple-input multiple-output techniques), and/or from different frequency bands (e.g., a multiple-protocol reconfigurable receiver).

The unprocessed signal received by each receiver chain in a group of K parallel receiver chains may be expressed as:

$$r_k(t) = x_k(t) e^{j2\pi f_k t}$$

where $k=1, \ldots, K$ is the index or number of a selected receiver chain; $r_k(t)$ is the original signal, perhaps including in-phase and quadrature components, received by the k-th RF chain; $x_k(t)$ is the corresponding baseband signal processed by the k-th RF chain; and $f_k$ is the equivalent carrier frequency for the k-th RF chain. It should be noted that additive Gaussian noise in the expression has been neglected to simplify the discussion, without loss of generality.

The carrier frequencies $f_k$ associated with each receiver chain may be the same or different depending on the application. For example, in some embodiments, a single receiver module may operate to support multiple communication protocols using different carrier frequencies, including for example, 802.11a, 802.11b, and Bluetooth simultaneously. In other embodiments, such as when a multiple antenna system is used, the carrier frequencies $f_k$ may be the same. For more information regarding various protocols, please refer to "IEEE Standards for Information Technology—Telecommunications and Information Exchange between Systems—Local and Metropolitan Area Network—Specific Requirements—Part 11: Wireless LAN Medium Access Control (MAC) and Physical Layer (PHY), ISO/IEC 8802-11: 1999" and "Bluetooth System Specification, Bluetooth Special Interest Group, Ver. 1.1, March 2001".

Conventional receivers with multiple RF chains may process the analog baseband signals $x_k(t)$ carried by the original signals $r_k(t)$ by including an ADC in each chain to sample the analog baseband signal $x_k(t)$ and convert it into a bit stream $x_k(i)$. Since multiple ADCs are employed and the portion of the semiconductor area for each ADC is relatively large compared to other portions of the receiver, the manufacturing cost and the power consumption of ADCs can increase linearly with the number of RF chains.

Thus, to reduce the number of duplicated analog circuit elements in certain circuit architectures, some embodiments may comprise a radio receiver having an analog stage to down-convert and shift the center frequency of a plurality of received signals by selected amounts (e.g., selected different amounts). The converted, shifted signals can be combined into a single, composite analog baseband signal. At this point, a single ADC may be used to sample the composite signal, obviating the need for an ADC in each of the chains. Since multiple ADCs are no longer necessary, substantial circuit layout area may be conserved. Banks of digital bandpass filters followed by down converters may then be used to recover appropriate sets of digital samples from the single ADC that correspond to the original plurality of received signals.

FIG. 1 is a block diagram of apparatus 100 and systems 110 according to various embodiments. Some embodiments may comprise an analog stage 114 coupled to a digital stage 116. The analog stage 114 may receive the original signals $r_k(t)$ using a plurality of sections 118 to process them so as to provide a composite baseband signal y(t). The digital stage 116 may receive the composite baseband signal y(t) to extract sets of digital samples $x_k(i)$ from the sampled data stream y(i) provided by a single ADC 120. Each set of digital samples $x_k(i)$ may correspond to one or more of the original signals $r_k(t)$.

In an embodiment, a combiner 124, which may comprise a power combiner, a mixer, and/or an adder, can be used to provide a single analog composite signal y(t) having a spectrum including the shifted spectrums of signals $y_k(t)$ for $k=1, \ldots, K$. To form y(t), each signal $r_k(t)$ may be down-converted (perhaps after passing through a bandpass filter 126, mixer 128, and another bandpass filter 132) to a corresponding signal $y_k(t)$ such that the resulting spectrums of all of the signals $y_k(t)$ are placed substantially adjacent each other in the frequency domain, with minimal spacing between one signal $y_k(t)$ and the next. In addition, the center frequency of the composite signal y(t) may be located at any selected frequency, which may be chosen to be about zero cycles-per-second so that the sampling rate of the ADC 120 can be minimized.

As noted above, each section 118 may include one or more mixers 128. The k-th mixer may thus operate to shift the center frequency of each original signal $r_i(t)$ from $f_i$ to $f_i - g_i$ as follows:

$$y_i(t) = r_i(t) e^{j2\pi (f_i - g_i) t}$$

where $k=1, \ldots, K$; and $g_k$ is the down conversion frequency for the corresponding original signal $r_i(t)$. Each of the resulting signals $y_i(t)$ may then be added together in the baseband to provide the composite signal y(t) is obtained. At this point, the ADC 120 may be used to sample the composite signal y(t) to provide a sampled data stream y(i), perhaps at the Nyquist sampling rate, well known to those of skill in the art.

An active channel controller 136 may operate to dynamically determine the down conversion frequency $g_k$ in accordance with the ON/OFF status of the sections 118 (e.g., an active chain is ON, and a disabled or inactive chain is OFF). The active channel controller 136 may also operate to determine the Nyquist sampling rate for the ADC 120 as a minimum rate. Thus, for example, in some embodiments, the apparatus 100 may include an active channel controller 136 to adjust the sampling rate associated with the ADC 120. In some embodiments, including an apparatus 100 that forms a part of a reconfigurable multi-protocol system, the number of active sections 118 or channels may vary, such that adjusting the Nyquist sampling rate for the ADC 120 can be used to reduce power consumption.

The sampled data stream y(i) provided by the ADC 120 may be sent to a plurality of digital signal processing modules 140 including digital bandpass filters 144, which may in turn provide sets of digital samples of $y_k(i)$. The sets of digital samples $\tilde{x}_k(i)$ may be obtained by down-sampling each corresponding set $y_k(i)$ using one or more down converters 148, well known to those of skill in the art. The down converters 148 may be digital down converters, and may comprise down samplers. An interference canceller 150, also well known to those of skill in the art, may be used to reduce noise in the digital samples $\tilde{x}_k(i)$ so as to provide processed digital signals $x_k(i)$. For further information regarding down converters, please refer to Chapter 10, "Digital Signal Processing: Principles, Algorithms, and Applications," $3^{rd}$ edition, by John G. Proakis and Dimitris G. Manolakis, Prentice Hall, 1996. For further information regarding interference cancellers, please refer to "Multiuser Detection," by S. Verdu, Cambridge University Press, 1998.

Thus, in some embodiments, an apparatus 100 may comprise an ADC 120 to receive a composite signal y(t) and an analog stage 114 to couple to the ADC 120. The analog stage 114 may operate to shift the center frequencies of a plurality of received signals $r_k(t)$ by selected amounts, which may be different, to provide a plurality of shifted signals $y_k(t)$ for combination into the composite signal y(t). The analog stage 114 may further comprise a plurality of sections 118 corresponding to the plurality of received signals $r_k(t)$, wherein selected ones of the sections 118 may include one or more bandpass filters 126, 132 and/or a mixer 128. The analog stage 114 may also include a combiner 124 selected from a power combiner, a mixer, and an adder.

Figure 2:
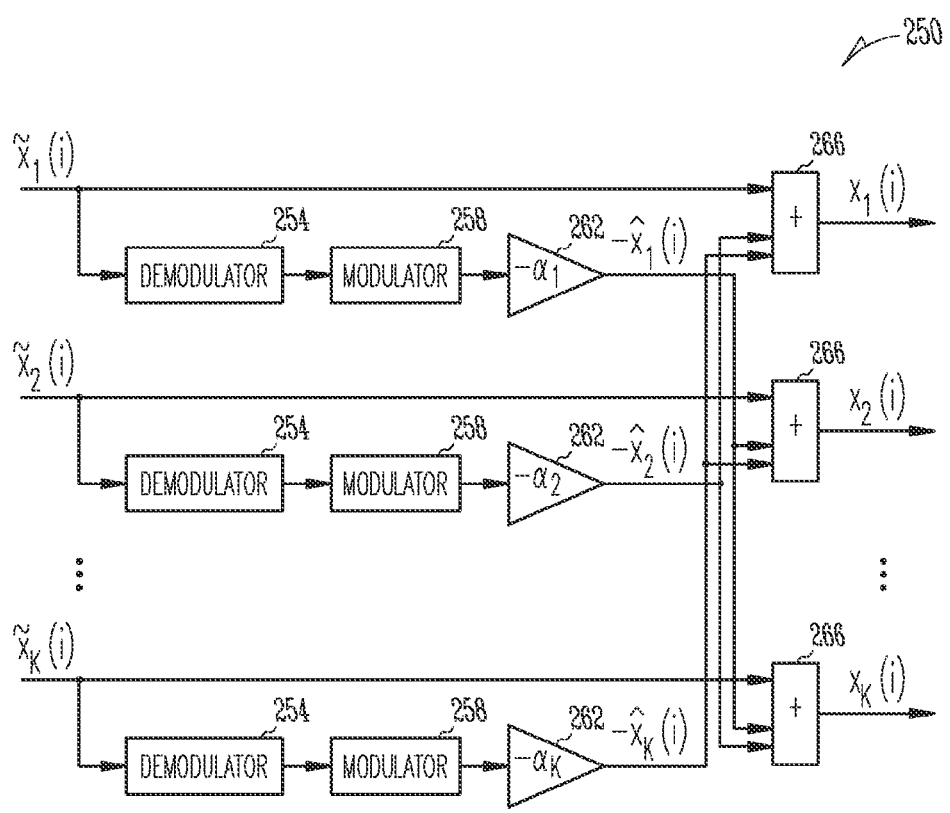
FIG. 2 is a block diagram of an interference canceller according to various embodiments.

FIG. 2 is a block diagram of an interference canceller 250 according to various embodiments. When the constituent spectrums of signals $y_k(t)$ in y(t) are located substantially adjacent in the frequency domain to reduce the sampling rate of the ADC 120 (see FIG. 1), interference from adjacent signals $y_k(t)$ due to the use of non-ideal filters 126, 132 (which may be analog band-pass filters) may result. Those of skill in the art, after reading the material disclosed herein, will realize that the spacing between the adjacent $y_k(t)$ signals in the frequency domain may therefore be determined by the capability of the filters 126, 132 (see FIG. 1) and the interference that can be tolerated between sections 118.

Thus, the interference canceller 250 may be used to mitigate the effects of such interference. Various types of interference cancellation are known to those of skill in the art. For example, the interference canceller 250 shown in FIG. 4 may be classified as a "multistage canceller". Of course, if the signals $y_k(t)$ are spaced far enough apart, some embodiments may not make use of an interference canceller 250.

The interference canceller 250 may operate by detecting (or demodulating) data (i.e., the samples $\tilde{x}_k(i)$) from each digital signal processing module 140 (shown in FIG. 1) using one or more demodulators 254. The demodulated data may then be modulated (using one or more modulators 258) to reconstruct the interference signal(s). The reconstructed interference signal(s) may then be multiplied by corresponding gain amplifiers 262 having an opposite phase (e.g., $-\alpha_k$, for k=1, 2, . . . , K). $\alpha_k$ may be determined by one or more of the channel gain, the receiver response, and/or filter responses. Finally, the reconstructed interference in adjacent channels may be subtracted at each channel using a plurality of adders 266. After the interference is canceled in this manner, the "clean" or processed signals $x_k(i)$ may be sent to demodulators (not shown).

It should be noted that the simplified apparatus 100 shown in FIGS. 1 and 2 may be appropriate for use in conjunction with orthogonal frequency division multiplexing (OFDM) modulation, since both the interfering and the interfered frequency tones may be located at the boundary of the interfering and interfered channels, respectively. The interference canceller 250 may also be useful in a near-far case, where the signal power associated with one signal $r_k(t)$ is much higher than adjacent ones. In this case, weak signals can be easily concealed by the strong signal's spectrum side lobes. However, using the apparatus 100, the strong signal may be correctly detected/demodulated so that the interfering side lobes can be removed from the weak signal's channel.

Thus, referring to FIG. 1, it can be seen that in some embodiments an apparatus 100 may include an interference canceller 150 to couple to the ADC 120. The apparatus 100 may also comprise a plurality of digital processing modules 140 corresponding to the plurality of received signals $r_k(t)$, wherein selected ones of the digital processing modules 140 include at least one digital bandpass filter 144 and/or a down converter 148.

In some embodiments, a system 110 may comprise an ADC 120 to receive a composite signal y(t), one or more analog stages 114, and one or more antennas 168 (which may be monopole antennas, dipole antennas, omnidirectional antennas, and/or patch antennas, among others) to couple to the analog stage 114. The analog stage 114, operating as described above to provide the composite signal y(t), may be coupled to the ADC 120.

The system 110 may include an interference canceller 150 and/or an active channel controller 136 to couple to the ADC 120 and/or the digital stage 116. The active channel controller 136 may be used to select a channel (e.g., "k") included in the composite signal y(t) corresponding to a selected protocol. For example, one section 118 may receive a signal $r_1(t)$ associated with a Bluetooth protocol. Another section 118 may receive a signal $r_2(t)$ associated with an IEEE 802.11a protocol. The active channel controller 136 may also operate to determine a down conversion frequency according to an activity status (e.g., ON or OFF) of a selected section 118 included in a plurality of sections 118 corresponding to the plurality of received signals $r_k(t)$.

The apparatus 100, systems 110, analog stage 114, digital stage 116, sections 118, ADC 120, combiner 124, bandpass filters 126, 132, mixers 128, active channel controller 136, digital signal processing modules 140, digital bandpass filters 144, down converters 148, interference cancellers 150, 250, antennas 168, demodulators 254, modulators 258, gain amplifiers 262, and adders 266 may all be characterized as "modules" herein. Such modules may include hardware circuitry, and/or one or more processors and/or memory circuits, software program modules, including objects and collections of objects, and/or firmware, and combinations thereof, as desired by the architect of the apparatus 100 and the systems 110, and as appropriate for particular implementations of various embodiments.

It should also be understood that the apparatus and systems of various embodiments can be used in applications other than for OFDM radios and multiple-element antenna systems, and thus, various embodiments are not to be so limited. The illustrations of apparatus 100 and systems 110 are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, processor modules, embedded processors, and application-specific modules, including multilayer, multi-chip modules. Such apparatus and systems may further be included as sub-components within a variety of electronic systems, such as televisions, cellular telephones, personal computers, workstations, radios, video players, vehicles, and others.

Figure 3:
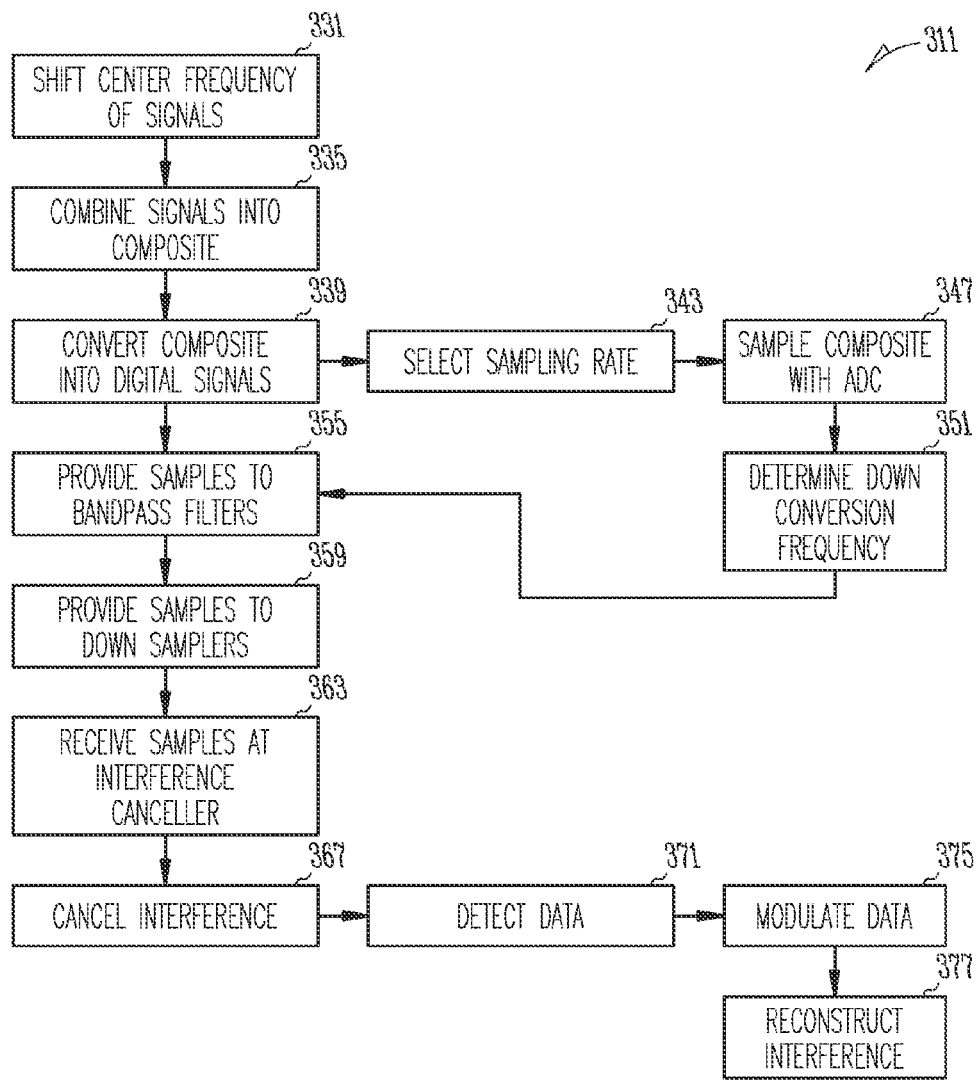
FIG. 3 is a flow chart illustrating several methods according to various embodiments.

FIG. 3 is a flow chart illustrating several methods 311 according to various embodiments. For example, a method 311 may (optionally) begin with shifting a center frequency of selected ones of a plurality of received signals $r_k(t)$ by selected amounts, which may be different, to provide a plurality of shifted signals $y_k(t)$ located in the frequency domain at block 331. The method 311 may continue with combining the plurality of shifted signals $y_k(t)$ into a composite signal y(t) centered at a selected frequency (e.g., approximately zero cycles-per-second) at block 335.

The plurality of received signals $r_k(t)$ may comprise a plurality of baseband analog signals. The plurality of shifted signals $y_k(t)$ may be located substantially sequentially in the frequency domain. The composite signal y(t) may include a plurality of protocols associated with the plurality of received signals $r_k(t)$, as well as a plurality of signals from a plurality of antennas.

A method 311 may also include converting the composite signal y(t) into a plurality of digital signals $\tilde{x}_k(i)$ at block 339, which may comprise selecting a single sampling frequency rate for the composite signal y(t) at block 343. The method 311 may also include sampling the composite signal y(t) with a single ADC to provide a sampled data stream including a multiplicity of digital samples y(i) at block 347, as well as determining a down conversion frequency for selected radio frequency signals associated with the plurality of received signals $r_k(t)$ at block 351.

The method 311 may continue at block 355 with providing the multiplicity of digital samples y(i) to a plurality of digital bandpass filters. One or more of the plurality of digital bandpass filters may operate to provide a series of digital channel samples $y_k(i)$ to one or more down converters at block 359, providing, in turn, a plurality of digital signals $\tilde{x}_k(i)$. An interference canceller may operate to receive the plurality of digital signals $\tilde{x}_k(i)$ at block 363.

The method 311 may continue with canceling interference present in the composite signal y(t) at block 367, which may in turn include detecting data present in a plurality of channels included in the composite signal y(t) at block 371. Canceling interference present in the composite signal y(t) at block 367 may also include modulating the data at block 375, and reconstructing the interference present in the composite signal y(t) at block 377.

It should be noted that the methods described herein do not have to be executed in the order described, or in any particular order. Moreover, various activities described with respect to the methods identified herein can be executed in serial or parallel fashion. Information, including parameters, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. The programs may be structured in an object-orientated format using an object-oriented language such as Java, Smalltalk, or C++. Alternatively, the programs can be structured in a procedure-orientated format using a procedural language, such as assembly or C. The software components may communicate using any of a number of mechanisms well-known to those skilled in the art, such as application program interfaces or interprocess communication techniques, including remote procedure calls. The teachings of various embodiments of the present invention are not limited to any particular programming language or environment, including Hypertext Markup Language (HTML) and Extensible Markup Language (XML).

Figure 4:
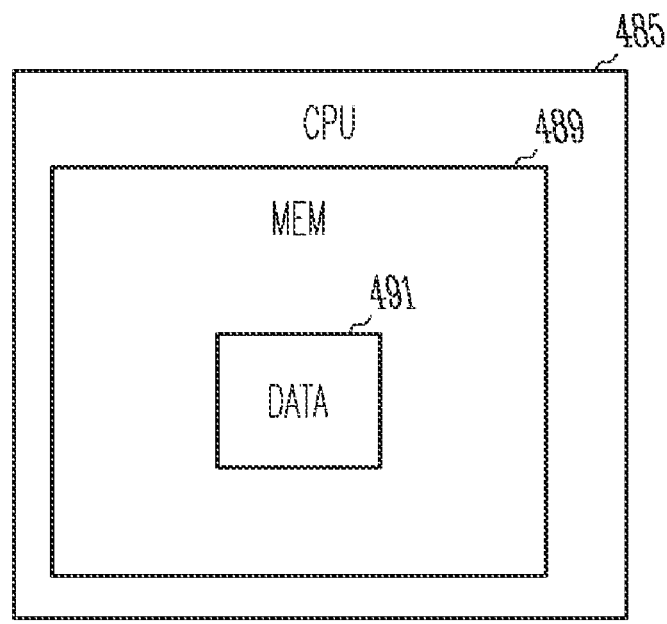
FIG. 4 is a block diagram of several articles according to various embodiments.

Thus, other embodiments may be realized. For example, FIG. 4 is a block diagram of an article 485 according to various embodiments, such as a computer, a memory system, a reconfigurable radio, a cellular telephone, a magnetic or optical disk, some other storage device, and/or any type of electronic device or system. The article 485 may comprise a machine-accessible medium such as a memory 489 (e.g., a memory including an electrical, optical, or electromagnetic conductor) having associated data 491 (e.g., computer program instructions), which when accessed, results in a machine performing such actions as shifting a center frequency of selected ones of a plurality of received signals by a selected amount to provide a plurality of shifted signals located in a frequency domain, and combining the plurality of shifted signals into a composite signal centered at a selected frequency (e.g., approximately zero cycles-per-second). As noted previously, the composite signal may include a plurality of protocols associated with the plurality of received signals, as well as a plurality of signals received from a plurality of antennas.

Other activities may include determining a down conversion frequency for selected radio frequency signals associated with the plurality of received signals, and selecting a single sampling frequency rate for the composite signal. The plurality of shifted signals may be located substantially sequentially in the frequency domain.

By implementing the apparatus, systems, and methods disclosed herein, the number of duplicated analog circuitry elements included in some product designs may be reduced, resulting in the manufacture of more reliable devices that are less expensive to produce. Other results may include reduced operating power requirements and smaller physical circuit size.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments of the invention. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment.

What is claimed is:

1. A method, comprising:
   shifting a center frequency of selected ones of a plurality of received signals by selected amounts to provide a plurality of shifted signals located in a frequency domain;
   combining the plurality of shifted signals into a composite signal centered at a selected frequency, the selected frequency being approximately zero cycles-per-second;
   sampling the composite signal with a single analog-to-digital converter to provide a multiplicity of digital samples;
   providing the multiplicity of digital samples to a plurality of digital bandpass filters; and
   canceling interference present in the composite signal, wherein canceling the interference present in the composite signal further comprises reconstructing the interference present in the composite signal.

2. The method of claim 1, wherein the plurality of shifted signals are located substantially sequentially in the frequency domain.

3. The method of claim 1, further comprising:
   converting the composite signal into a plurality of digital signals.

4. The method of claim 3, further comprising:
   receiving the plurality of digital signals at an interference canceller.

5. The method of claim 1, wherein at least one of the plurality of digital bandpass filters provides a series of digital channel samples, further comprising:
   providing the series of digital channel samples to a down converter.

6. The method of claim 1, wherein the plurality of received signals comprises a plurality of baseband analog signals.

7. An article comprising a machine-accessible medium having associated data, wherein the data, when accessed, results in a machine performing:
   shifting a center frequency of selected ones of a plurality of received signals by a selected amount to provide a plurality of shifted signals located in a frequency domain;
   combining the plurality of shifted signals into a composite signal centered at a selected frequency, the selected frequency being approximately zero cycles-per-second;
   sampling the composite signal with a single analog-to-digital converter to provide a multiplicity of digital samples;
   providing the multiplicity of digital samples to a plurality of digital bandpass filters, wherein the composite signal includes a plurality of protocols associated with the plurality of received signals; and
   canceling interference present in the composite signal, wherein canceling the interference present in the composite signal further comprises reconstructing the interference present in the composite signal.

8. The article of claim 7, wherein the composite signal includes a plurality of signals from a plurality of antennas.

9. The article of claim 7, wherein the data, when accessed, results in the machine performing:
   selecting a single sampling frequency rate for the composite signal; and
   determining a down conversion frequency for selected radio frequency signals associated with the plurality of received signals.

10. The article of claim 7, wherein the plurality of shifted signals are located substantially sequentially in the frequency domain.

11. An apparatus, comprising:
    a single analog-to-digital converter to sample a composite signal and to provide a multiplicity of digital samples, the composite signal being centered at a selected frequency of approximately zero cycles-per-second;
    a plurality of digital bandpass filters to couple to the analog-to-digital converter and to receive the multiplicity of digital samples;
    an analog stage to couple to the analog-to-digital converter, wherein the analog stage is to shift a center frequency of a plurality of received signals by a selected amount to provide a plurality of shifted signals for combination into the composite signal, and wherein the composite signal includes a plurality of protocols associated with the plurality of received signals; and
    an active channel controller to couple to the analog-to-digital converter, wherein the active channel controller is to determine a down conversion frequency according to an activity status of a selected section included in a plurality of sections corresponding to the plurality of received signals.

12. The apparatus of claim 11, wherein the analog stage further comprises:
    a plurality of sections corresponding to the plurality of received signals, wherein selected ones of the sections include at least one bandpass filter and a mixer.

13. The apparatus of claim 11, wherein the analog stage further comprises:
    a combiner selected from a power combiner, a mixer, and an adder.

14. The apparatus of claim 11, further comprising:
    an interference canceller to couple to the analog-to-digital converter.

15. The apparatus of claim 11, further comprising:
    a plurality of digital processing modules corresponding to the plurality of received signals, wherein selected ones of the digital processing modules include at least one of the digital bandpass filters and a down converter.

16. The apparatus of claim 11, wherein
    the active channel controller is to adjust a sampling rate associated with the analog-to-digital converter.

17. A system, comprising:

a single analog-to-digital converter to sample a composite signal and to provide a multiplicity of digital samples, the composite signal being centered at a selected frequency of approximately zero cycles-per-second;

a plurality of digital bandpass filters to couple to the analog-to-digital converter and to receive the multiplicity of digital samples;

an analog stage to couple to the analog-to-digital converter, wherein the analog stage is to shift a center frequency of a plurality of received signals by a selected amount to provide a plurality of shifted signals for combination into the composite signal;

an omnidirectional antenna to couple to the analog stage; and an active channel controller to couple to the analog-to-digital converter, wherein the active channel controller is to determine a down conversion frequency according to an activity status of a selected section included in a plurality of sections corresponding to the plurality of received signals.

18. The system of claim 17, further comprising:

an interference canceller to couple to the analog-to-digital converter.

19. The system of claim 17, wherein the active channel controller is to select a channel included in the composite signal corresponding to a selected protocol.

\* \* \* \* \*